(12) United States Patent
Rumsby (10) Patent No.: US 9,796,046 B2
(45) Date of Patent: Oct. 24, 2017

(54) METHOD AND APPARATUS FOR COMPENSATING FOR OFF-AXIS FOCAL SPOT DISTORTION

(75) Inventor: Philp Thomas Rumsby, Oxon (GB)

(73) Assignee: M-Solv Ltd., Oxford (GB)

( * ) Notice: Subject to any disclaimer, the term of this patent is extended or adjusted under 35 U.S.C. 154(b) by 420 days.

(21) Appl. No.: 12/992,947

(22) PCT Filed: May 15, 2009

(86) PCT No.: PCT/GB2009/001220
§ 371 (c)(1),
(2), (4) Date: Nov. 16, 2010

(87) PCT Pub. No.: WO2009/141584
PCT Pub. Date: Nov. 26, 2009

(65) Prior Publication Data
US 2011/0127241 A1    Jun. 2, 2011

(30) Foreign Application Priority Data
May 17, 2008   (GB) .................................. 0809003.7

(51) Int. Cl.
*B23K 26/00*   (2014.01)
*B23K 26/06*   (2014.01)
*B23K 26/364*  (2014.01)
*B23K 26/082*  (2014.01)

(52) U.S. Cl.
CPC ........ *B23K 26/0626* (2013.01); *B23K 26/082* (2015.10); *B23K 26/364* (2015.10)

(58) Field of Classification Search
CPC .. B23K 26/365; B23K 26/38; B23K 26/0807; B23K 26/367; B23K 26/026; B23K 26/082; G05B 2219/45041

USPC .............. 219/121.61–121.83, 61, 62, 68, 69; 372/26
See application file for complete search history.

(56) References Cited

U.S. PATENT DOCUMENTS

| | | | | |
|---|---|---|---|---|
| 4,430,549 A | * | 2/1984 | Macken | B23K 26/0738 219/121.67 |
| 4,928,284 A | * | 5/1990 | Burns | 372/31 |
| 4,970,600 A | * | 11/1990 | Garnier | B23K 26/361 219/121.68 |
| 5,204,867 A | * | 4/1993 | Koschmann | 372/33 |

(Continued)

FOREIGN PATENT DOCUMENTS

| | | | | |
|---|---|---|---|---|
| GB | 2354845 A | * | 4/2001 | ............. B23K 26/04 |
| WO | WO 2008069099 A1 | * | 6/2008 | ............... B28D 5/00 |

OTHER PUBLICATIONS

Website: http://en.wikipedia.org/wiki/Nd:YAG_laser.*

(Continued)

*Primary Examiner* — Dana Ross
*Assistant Examiner* — Lawrence Samuels
(74) *Attorney, Agent, or Firm* — KED & Associates LLP (57) ABSTRACT

A method and apparatus is described that allows accurate control of the width of fine line structures ablated by lasers in thin films on substrates when using scanner and focussing lens systems. The method provides dynamic compensation for optical distortions introduced by the scan lens at off axis points by increasing the laser power or energy in the beam in order to overcome the reduction in power or energy density.

5 Claims, 5 Drawing Sheets

(56) References Cited

U.S. PATENT DOCUMENTS

| | | | | |
|---|---|---|---|---|
| 5,386,427 | A * | 1/1995 | Zayhowski | G02B 7/028 372/34 |
| 5,466,904 | A * | 11/1995 | Pfeiffer | B82Y 10/00 219/121.25 |
| 5,517,349 | A * | 5/1996 | Sandstrom | 359/313 |
| 5,541,731 | A * | 7/1996 | Freedenberg et al. | 356/496 |
| 5,561,544 | A * | 10/1996 | Macken | 359/201.1 |
| 5,593,606 | A * | 1/1997 | Owen | C23C 14/046 219/121.71 |
| 5,670,069 | A * | 9/1997 | Nakai | B23K 26/0656 219/121.64 |
| 5,854,803 | A * | 12/1998 | Yamazaki et al. | 372/31 |
| 5,916,461 | A * | 6/1999 | Costin et al. | 219/121.68 |
| 5,925,271 | A * | 7/1999 | Pollack | B23K 26/02 219/121.74 |
| 6,195,164 | B1 * | 2/2001 | Thompson | A61B 18/20 219/121.6 |
| 6,370,171 | B1 * | 4/2002 | Horn | B23K 26/702 372/29.01 |
| 6,462,301 | B1 * | 10/2002 | Scott et al. | 219/121.67 |
| 6,615,099 | B1 * | 9/2003 | Muller et al. | 700/166 |
| 6,944,111 | B2 * | 9/2005 | Nakamura | G11B 7/1365 369/112.22 |
| 7,145,710 | B2 * | 12/2006 | Holmes | 359/279 |
| 7,176,407 | B2 * | 2/2007 | Hunter | B23K 26/04 219/121.7 |
| 7,888,621 | B2 * | 2/2011 | Abrott | B23K 26/03 219/121.61 |
| 2002/0125231 | A1 * | 9/2002 | Hunter | B23K 26/04 219/121.69 |
| 2003/0090562 | A1 * | 5/2003 | Kubota | B23K 26/0639 347/241 |
| 2003/0137656 | A1 * | 7/2003 | Fuse | 356/124 |
| 2003/0179430 | A1 | 9/2003 | Kurosawa | 359/212 |
| 2004/0065643 | A1 * | 4/2004 | Tanaka | 219/121.8 |
| 2004/0074881 | A1 * | 4/2004 | Oishi | 219/121.63 |
| 2004/0188402 | A1 * | 9/2004 | Horsting | B23K 26/0656 219/121.75 |
| 2006/0180581 | A1 * | 8/2006 | Swaringen et al. | 219/121.83 |
| 2006/0256181 | A1 * | 11/2006 | Ehrmann et al. | 347/137 |
| 2008/0017619 | A1 * | 1/2008 | Yamakawa | B23K 26/03 219/121.81 |
| 2008/0023455 | A1 * | 1/2008 | Idaka | B23K 26/082 219/121.73 |
| 2008/0078751 | A1 * | 4/2008 | Abrott | B23K 26/03 219/121.69 |
| 2008/0095968 | A1 * | 4/2008 | Semon | G04D 3/0079 428/66.1 |
| 2008/0116183 | A1 * | 5/2008 | Curry | B23K 26/083 219/121.75 |
| 2009/0095722 | A1 * | 4/2009 | Ehrmann | B23K 26/06 219/121.72 |
| 2009/0314751 | A1 * | 12/2009 | Manens | H01L 31/022425 219/121.69 |
| 2010/0065537 | A1 * | 3/2010 | Watatani | B28D 5/00 219/121.72 |
| 2010/0078419 | A1 * | 4/2010 | Johansen et al. | 219/121.79 |
| 2011/0127697 | A1 * | 6/2011 | Milne | B23K 26/046 264/400 |
| 2012/0273472 | A1 * | 11/2012 | Unrath | B23K 26/0732 219/121.73 |
| 2016/0187646 | A1 * | 6/2016 | Ehrmann | G02B 13/0095 219/121.73 |

OTHER PUBLICATIONS

Geusic, J. E.; Marcos, H. M.; Van Uitert, L. G. (1964). "Laser oscillations in nd-doped yttrium aluminum, yttrium gallium and gadolinium garnets". Applied Physics Letters 4 (10): 182. Bibcode:1964ApPhL...4..182G. doi:10.1063/1.1753928.*

Webb, Colin & Julian Jones, eds., Handbook of Laser Technology and Applications, vol. III, Institute of Physics Publishing, 2003.*

Dickley, Fred, Scott Holswade, eds., Laser Beam Shaping: Theory and Techniques, Marcel Decker, Inc., 2000.*

Livingston, F.E., et al.; "Tailoring Light Pulse Amplitudes for Optimal Laser Processing and Material Modification"; Applied Surface Science; Elsevier; Amsterdam, Netherlands; vol. 253, No. 19, Jul. 18, 2007; pp. 8015-8021 (XP-022156145).

PCT International Search Report dated Oct. 9, 2009 issued in Application No. PCT/KR2009/001220.

* cited by examiner

Figure 8

METHOD AND APPARATUS FOR COMPENSATING FOR OFF-AXIS FOCAL SPOT DISTORTION

CROSS-REFERENCE TO RELATED PATENT APPLICATIONS

This application is a U.S. National Stage Application under 35 U.S.C. §371 of PCT Application No. PCT/GB2009/001220, filed May 15, 2009, which claims priority to Great Britain Application No. 0809003.7, filed May 17, 2008.

TECHNICAL FIELD

This invention relates to a method and apparatus for compensating for off-axis focal spot distortion that arises when a scanner and lens are used in the formation of fine line structures in a substrate by direct write ablation. In particular, it relates to the correction of aberrations of the focal spot over the scan field of the lens in order to control the width of an ablated line pattern. This invention is particularly appropriate for the high resolution, fine line patterning of thin films or layers of materials on glass, polymer, metal or other flat substrates.

BACKGROUND ART

The techniques for marking or patterning flat substrates by laser ablation using beam scanners and focussing lenses is extremely well known and many different arrangements for carrying out this operation are used.

The lasers used cover almost all lasers commonly available with wavelengths ranging from the (deep ultra violet) DUV at 193 nm to the (far infra-red) FIR at 10.6 µm, with pulse lengths ranging from the femto-second range to continuous (CW) operation and with average powers ranging from the fraction of a Watt level to many hundreds of Watts.

Laser beam scanner units are commonly based on dual axis oscillating mirrors driven by galvanometer or other motors where the requirement is to mark or pattern over a two dimensional area. For the case where scanning in one axis only is required rotating polygonal mirrors are often used.

A variety of different lenses are used to focus the beam onto the substrate surface. These can range from simple singlet lenses to complex multi-element lenses. The lenses can be located either before or after the scanner unit. For the case where it is situated after the scanner unit, a lens of telecentric type is often used.

A common feature of all these scanning optical systems is that the quality of the focal spot generated on the surface of a flat substrate at off-axis points away from the centre of the scan field is always inferior in terms of minimum size and optimum shape to that generated on axis in the centre of the scan field. These off-axis focal spot distortion effects are due to aberrations induced in the laser beam as it passes at an angle through the scan lens elements. The distortion effects get significantly worse at the extremes of the lens scan field.

One major scan lens aberration is that of field curvature. In this case the smallest focal spots obtainable at off axis points occur at different distances from the lens compared to that for an on axis point. This means that the focal spot formed at an off axis point on a flat substrate is of different diameter to that formed on axis leading to variations in the power and energy density over the scan field. This aberration is readily correctable by the addition of an extra axis to the scanner unit in the form of a dynamically controlled variable telescope. This unit varies the collimation of the beam and causes the beam entering the lens to diverge or converge such that the distance of the focal spot from the lens can be controlled. By this method, the optimum beam focal spot can be arranged to coincide exactly with the surface of a flat substrate at all points over the scan field right up to the extreme edges. Such field flattening techniques are well known and suitable equipment, able to dynamically correct for field curvature, is readily available.

However, other serious off-axis lens aberration effects exist that are not so readily correctable. These are the aberrations that lead to distortion of the focal spot shape as the beam moves from the centre of the field to the extremes. In their very simplest form, these aberrations lead to an increase in the diameter of the Gaussian profile focal spot at the field edges compared to the field centre. In their more usual form, however, these aberrations cause a distortion of the shape of the off axis focal spots with the formation of a comet-like tail. The power or energy density distribution may depart very significantly from a Gaussian distribution. The main effect of these focal spot distorting aberrations is to spread the laser beam power or pulse energy over a larger area and hence reduce the peak power or peak pulse energy density in the off-axis focal spots compared to those in a focal spot on axis.

The process of laser ablation of materials generally has a well defined threshold in terms of laser power or energy density and hence the width of any line structure ablated in a thin film or layer of material depends on the diameter of the focal spot at a power or energy density level equal to the ablation threshold. Hence, any lens aberrations that give rise to a spreading of the laser power or energy over a larger area or a departure from a Gaussian distribution with an enhanced level of energy or power in the wings of the distribution will cause a reduction in the peak power or energy density in the focal spot and can cause a change in the diameter of the focal spot at the level set by the ablation threshold and a corresponding change in the width of the line structure ablated. This line width change can be an increase or a decrease depending on the level of the threshold for ablation compared to the peak power or energy density. In the worst case, where the ablation threshold power or energy density level is close to the peak value and the process window in terms of allowed variation from maximum to minimum power or energy density is small, then any significant reduction in the peak power or energy density in the focal spot can cause the peak level to drop below the ablation threshold and no line will be ablated.

For high resolution line structures in thin and thick film based functional devices such as printed circuit boards, touch screens, displays, sensors, solar panels and other micro-electronic devices, accurate control of the width of the ablated structure is of paramount importance to ensure reliable operation. In this case, a method for overcoming the off axis uncorrectable lens aberrations is required. Adding more elements to the lens reduces the off axis distortion effects and can significantly improve the lens performance but such a solution significantly increases system complexity and cost and does not completely solve the problem.

The invention described herein seeks to provide an alternative way to compensate for the off axis, focal spot distorting aberrations found in standard scan lenses.

DISCLOSURE OF INVENTION

According to a first aspect of the invention, there is provided apparatus for compensating for off-axis focal spot distortion that arises when a scanner and lens are used in the formation of fine line structures in a substrate by direct write laser ablation, the apparatus comprising:
  a laser unit for providing a laser beam;
  a scanner unit for scanning the laser beam across a substrate from an on-axis position to off-axis positions;
  a focussing lens for focussing the laser beam on the substrate;
  power changing means for changing the laser output power or pulse energy; and
  a controller unit for controlling the power changing means so as to dynamically change the laser output power or pulse energy in dependence upon the position of the focal spot relative to the on-axis position.

According to a second aspect of the invention, there is provided a method of compensating for off-axis focal spot distortion that arises when a scanner and lens are used in the formation of fine line structures in a substrate by direct write laser ablation, the method comprising the steps of:
  providing a laser beam;
  scanning the laser beam across a substrate from an on-axis position to off-axis positions;
  focussing the laser beam on the substrate; and
  dynamically changing the laser output power or pulse energy in dependence upon the position of the focal spot relative to the on-axis position.

This invention relates to the operation of a system involving a laser unit, a laser beam scanner unit and a laser beam focussing lens. The system may be used to ablatively write fine lines in thin films or other layers of material on flat substrates. Examples of appropriate materials for laser processing include thin layers of transparent conductive oxides (eg Indium-tin oxide (ITO), SnO2, ZnO, etc), metals, inorganic semiconductors eg amorphous silicon (α-Si), microcrystalline silicon (μc-Si), poly-crystalline silicon (poly-Si), copper-indium-gallium-sulphide (CIGS), cadmium telluride (CdTe), etc), organic semiconductors, organic light emitting diodes (OLEDs), etc) and thicker layers of polymers and resins as would be used in printed circuit boards (PCBs).

The laser can operate at any wavelength from the deep UV at 193 nm right up to the far IR at 10.6 μm. It can be of pulsed type and operate in any modulated, Q-switched or mode-locked pulsed mode. Alternatively, the laser can be of continuous (CW) type and operate in continuous, modulated continuous or ultra high repetition rate quasi-continuous mode. The laser beam scanner unit can move the laser beam in either one or two axes and can be of oscillating mirror or rotating polygonal mirror type. The laser beam focussing lens can of any simple or complex type and can be located either before or after the scanner unit.

An important feature of the apparatus described is that means are provided so that the laser power or pulse energy density can be changed at points in the scan field that are off the primary axis where optical distortion effects introduced by the lens cause the focal spot on the substrate to increase in area such that the peak power or energy density is reduced and the width of the ablated line structure in the layer of material on the substrate changes from the value obtained at a point on the primary axis of the lens.

The laser output power or pulse energy is able to be dynamically changed as the laser beam is progressively scanned across the scan area so that at all points in the scan field the power or energy in the beam is maintained at the desired value.

Preferably, the change in the power or pulse energy in the laser beam at each off axis point compared to the on axis position is by such an amount so as to exactly or substantially restore the width of the ablated line structure at that point to the value obtained at a point on the primary lens axis.

Two principal methods are envisaged for changing the laser power or pulse energy. In one case, a laser beam modulator unit of acousto-optic or electro-optic type is positioned after the laser output aperture. This approach is appropriate for all laser types where suitable transmissive modulators exist but is most relevant for lasers that are CW or quasi CW. Such equipment is readily available over the wavelength range from 266 nm to 10.6 μm. Another method for modulating the laser output applies in the case of Q-switched diode pumped solid state lasers that have appropriate electronic functionality to be able to be triggered externally by a train of suitable electrical pulses with the energy level of individual pulses controllable by varying the width of the trigger pulses. Such lasers, operating at wavelengths of 355 nm, 532 nm and 1.06 μm are readily available.

Whatever method is used to change the laser output power or pulse energy it is necessary to drive that device dynamically with a train of suitable electronic signals that relate to the particular value of power or pulse energy needed at each point in the scan field. Clearly, it is desirable to determine the variation in laser power or pulse energy required at any off axis point in order to restore the width of the ablated line to the same value as that on axis. In a preferred arrangement this can be carried out by making a reference fine line pattern over the full scan area of a test sample with the laser operating with constant power or pulse energy and then measuring the variation in ablated line width (compared to that on axis) at selected off axis sites. These measurements are then, used to form the basis of a calibration data set that is incorporated into the scanner control software and is subsequently used to drive the device that controls the laser output power or pulse energy in order to adjust the energy or power in the beam focus to maintain the line width constant over the scan area.

Determination of the correct calibration data set for a particular thin film sample may require several test sample production iterations since the line width dependence on the laser power or energy density may be either a positive or a negative function and in both cases is unlikely to be linear. Hence the final degree to which the power or pulse energy needs to be changed to hold the line width exactly constant can best be determined experimentally.

Other preferred and optional features of the invention will be apparent from the following description and from the subsidiary claims of the specification.

BRIEF DESCRIPTION OF DRAWINGS

The invention will now be further described, merely by way of example, with reference to the accompanying drawings, in which.

DETAILED DESCRIPTION OF DRAWINGS

Figure 1:
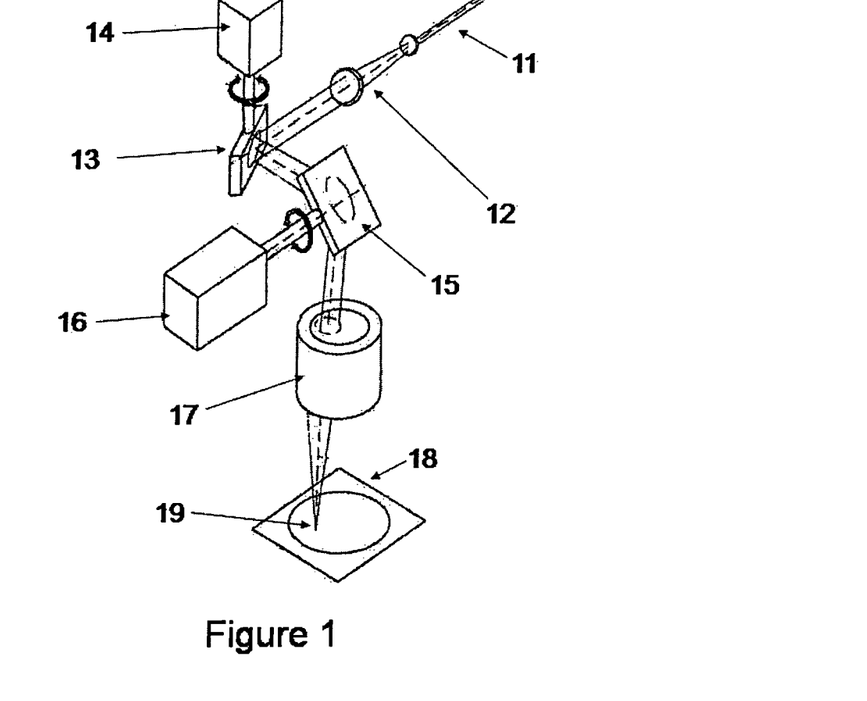
FIG. 1 is a schematic, perspective view of a typical 2-D scanner and associated focussing lens arrangement.

FIG. 1

FIG. 1 shows an example of one type of laser and scanner system to which the invention can be applied. A beam 11 from a laser is expanded in a telescope 12 and is then deflected over a range of angles by a mirror 13 attached to a galvanometer motor 14. A second mirror 15 attached to a second galvanometer motor 16 deflects the beam over a range of angles in an orthogonal direction to the first mirror 13. A scan lens 17 accepts the beam and focuses it onto a flat substrate 18 to form a small focal spot 19. This figure shows a 2-axis scanner moving the focal spot 19 in two orthogonal axes over the surface of a flat substrate 18. By adding a servo motor drive (not shown) to one of the lens elements in the telescope 12, the system can be readily up-rated to a 3-axis system with capability to move the focal spot 19 along the optical axis and compensate for the field curvature of the scan lens 17.

Figure 2:
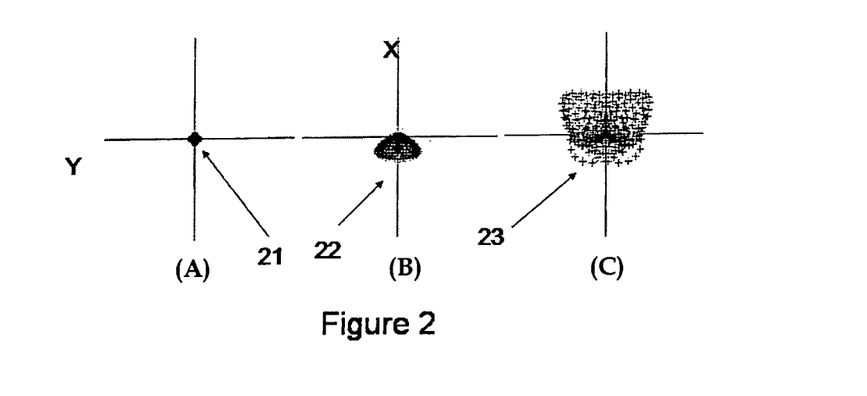
FIGS. 2A, 2B and 2C show computed spot diagrams for the focal spots for a typical scan lens.

FIG. 2

FIG. 2 shows three computer generated plots of the theoretical 2D shape of focal spots that occur at different points in the field of a typical multi-element UV (355 nm) scan lens of 150 mm focal length. The plots are in the form of so called "spot diagrams" where the density of crosses indicates the power or energy density. The three diagrams A, B and C respectively correspond to an on axis point 21, a point 22 at 25 mm radius and a point 23 at 50 mm radius. The figures show clearly that the focal spot shape deteriorates significantly as the beam moves away from the centre point with energy being moved from the spot centre to the peripheral regions of the focal spot.

Figure 3:
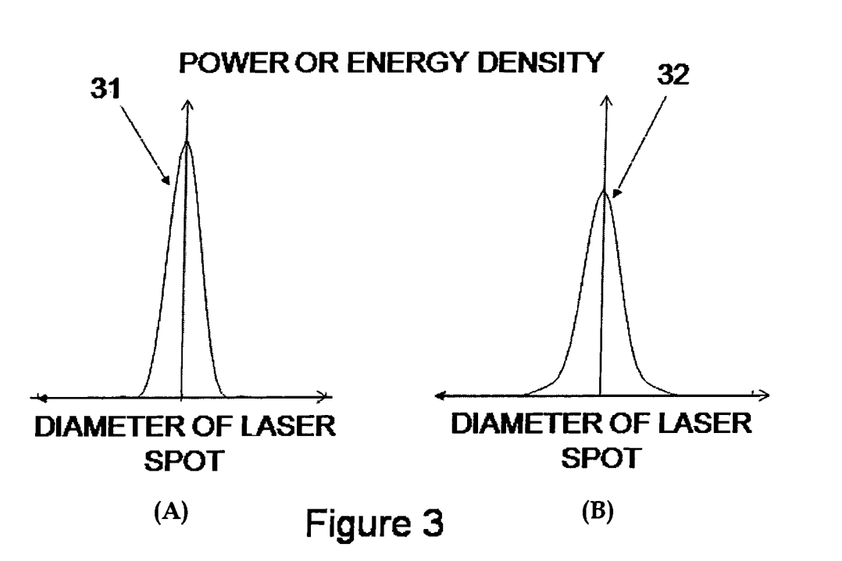
FIGS. 3A and 3B are graphs showing computed focal spot energy density profiles for a typical scan lens.

FIG. 3

FIG. 3 shows two computer generated plots of the theoretical power or energy density profile within the focal spots that occur at different points in the field of a typical multi-element UV (355 nm) scan lens 17 of 150 mm focal length. The plots 31 and 32 are cross-sections of the focal spot distributions on axis and at 40 mm radius respectively. The figures show clearly that the focal spot distribution deteriorates significantly and departs from Gaussian as the beam moves away from the centre point with energy being moved from the spot centre to the wings of the focal spot.

Figure 4:
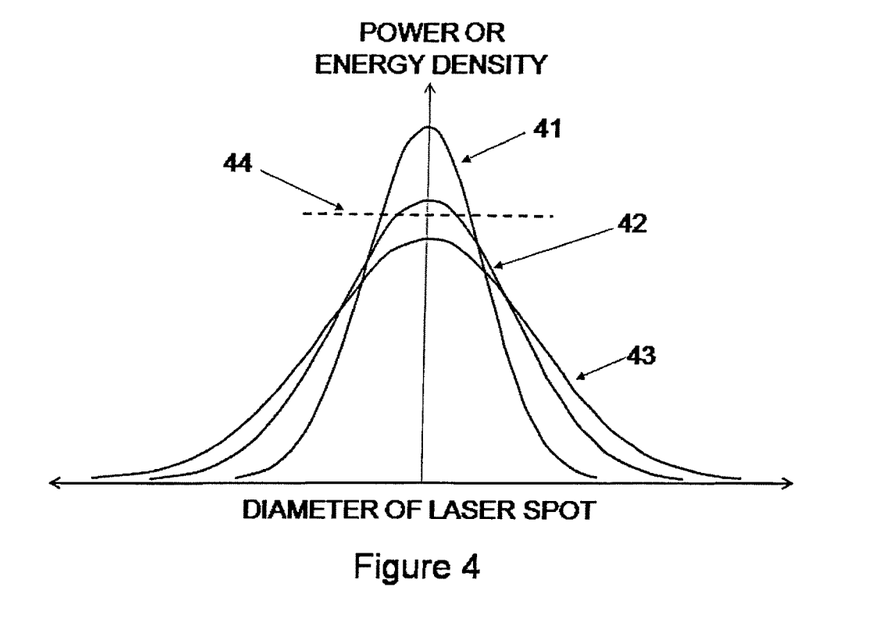
FIG. 4 is a graph showing how the ablated line width can reduce as the focal spot diameter increases.

FIG. 4

FIG. 4 shows simple representations of three possible laser power or energy density distributions at different radial points in the field of a scan lens. In this case the distributions are all assumed to be Gaussian. The power or energy in the laser beam is the same in all cases and hence as the width of the distributions, and hence the focal spot diameters, increase as one moves from a point (curve 41) on axis to a point (curve 42) half way from the axis to the edge of the field and finally to an extreme point (curve 43) so the peak values of each distribution decreases. The figure shows the case where the threshold level 44 for ablation in terms of power or energy density is relatively close to the peak of the distribution as would occur if the difference between the optimum material ablation level and the threshold for ablation of the underlying substrate is small. In the simple case illustrated, it is assumed that the point where the ablation level 44 crosses the power or energy density distribution curve defines the width of the ablated line structure. The intersection between the curves 41 and 42 with the threshold line 44 shows clearly that as the beam moves away from the lens axis and the focal spot broadens, and the peak power or energy density decreases, the diameter of the region of the focal spot that exceeds the ablation threshold reduces leading to a reduction in the width of the ablated line.

From FIG. 4 it can also be seen that the width of the ablated line can be restored to its on axis value by increasing the power or energy in the laser beam by an amount that causes the diameter of the focal spot at the ablation threshold level 44 to increase to its on-axis value. The figure also illustrates the extreme case (curve 43) where as the beam moves further from the lens axis and the focal spot broadens even further so the peak of the distribution curve drops below the ablation threshold 44 leading to a situation where ablation of material no longer occurs.

Figure 5:
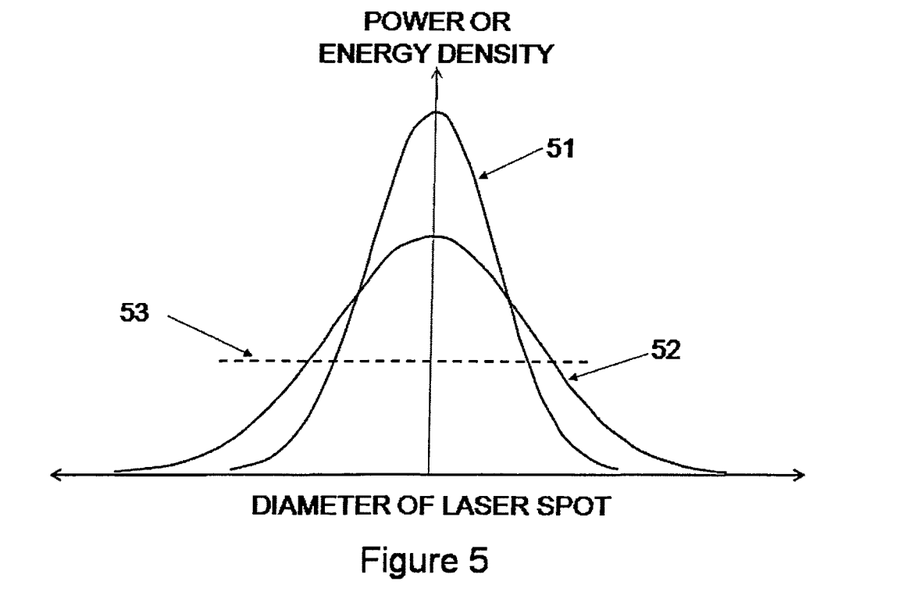
FIG. 5 is a graph showing how the ablated line width can increase as the focal spot diameter increases.

FIG. 5

FIG. 5 shows another simple representation of two possible laser power or energy density distributions at different radial points in the field of a scan lens 17. In this case, the distributions are again both assumed to be Gaussian. The power or energy in the laser beam in both cases is the same and hence the width of the distributions, and hence the focal spot diameters, increase as one moves from a point on axis (curve 51) to an extreme point (curve 52) so the peak value of the distribution decreases. The figure shows the case where the threshold level 53 for ablation in terms of power or energy density is significantly below the peak of the distribution as might occur if the optimum level for material ablation is significantly higher than the threshold for ablation of the underlying substrate. In the simple case illustrated, it is assumed that the point where the ablation level crosses the power or energy density distribution defines the width of the ablated line structure. The figure shows clearly that, in this case, as the beam moves away from the lens axis, and the focal spot broadens, and the peak power or energy density decreases, the diameter of the region of the focal spot that exceeds the ablation threshold 53 increases so the width of the ablated line structure also increases. It can also be appreciated from the figure that the width of the ablated line can be restored to its on axis value by decreasing the power or energy in the laser beam by an amount that causes the diameter of the focal spot at the ablation threshold level 53 to reduce to its on axis value.

Figure 6:
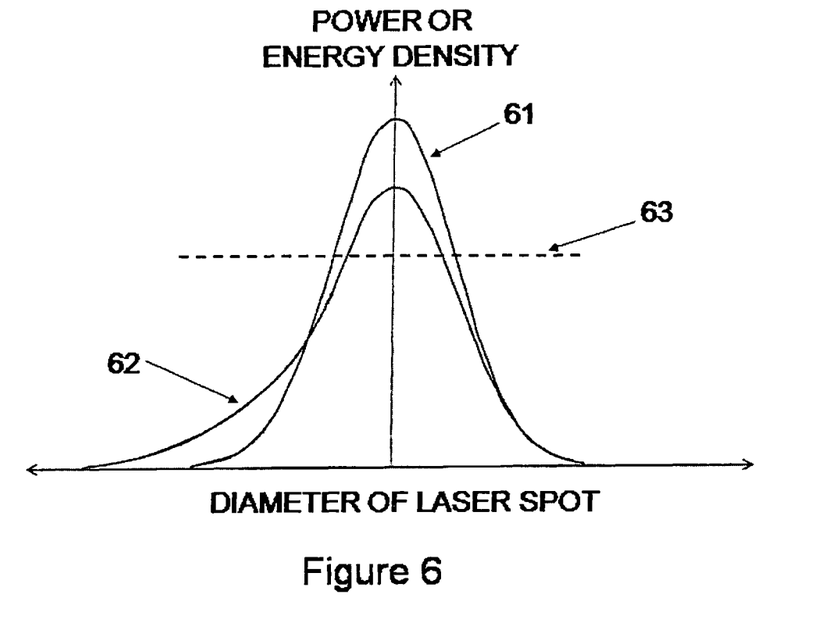
FIG. 6 is a graph showing how the ablated line width can decrease as the focal spot becomes distorted.

FIG. 6

FIG. 6 shows a further simple representation of two possible laser power or energy density distributions at different radial points in the field of a scan lens 17. In this case, the distribution 61 at the on-axis point is assumed to be Gaussian but the distribution 62 at the off-axis point is no longer Gaussian and has significantly more energy on one side of the peak than the other. As the power or energy in the laser beam is the same for both positions, and as the threshold level 63 for ablation is relatively close to the peak of the distribution so the diameter of the region of the focal spot that exceeds the ablation threshold reduces, so the width of the ablated line reduces, as the beam moves from the axis to a point off axis. It can also be appreciated from this figure that the width of the ablated line can be restored to its on axis value by increasing the power or energy in the laser beam by an amount that causes the diameter of the focal spot at the ablation threshold level 63 to return to its on axis value.

Figure 7:
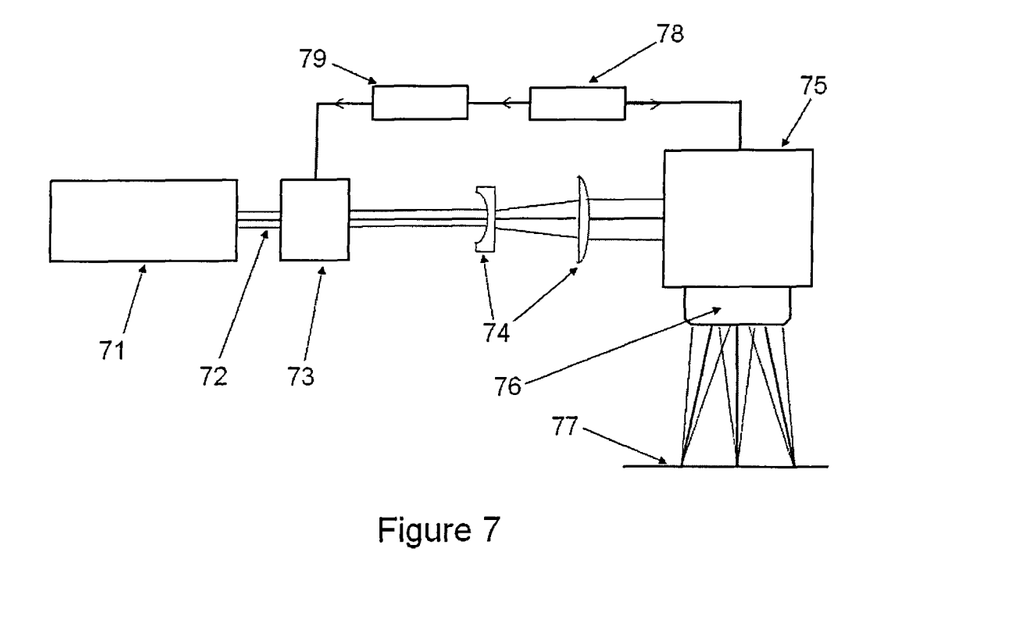
FIG. 7 is a schematic diagram of apparatus for dynamically controlling the output of the laser.

FIG. 7

FIG. 7 shows an apparatus for implementing the invention with any type of laser. A laser system 71 emits a beam 72 that passes through a modulator 73 where the degree of optical transmission can be controlled. Beam expansion telescope 74 adjusts the beam diameter to suit the requirements of the application. A scanner unit 75 has two orthogonal moving mirrors so that the beam is deflected in two axes. A lens 76 focuses the beam onto the surface of a flat substrate 77. The scanner mirrors are driven by system master controller unit 78. This unit feeds a signal to a driver unit 79 that controls the degree of transmission of the modulator. The master controller 78 contains a calibration file that contains information relating each position in the two dimensional scan field to the laser power or energy required at that point to ablate a line of defined width. As the master controller 78 drives the scanner mirrors to make the beam move over the two dimensional scan field, it also feeds appropriate signals to the modulator driver 79 in order to adjust the transmission of the modulator 73 to maintain the width of the ablated line pattern constant.

Figure 8:
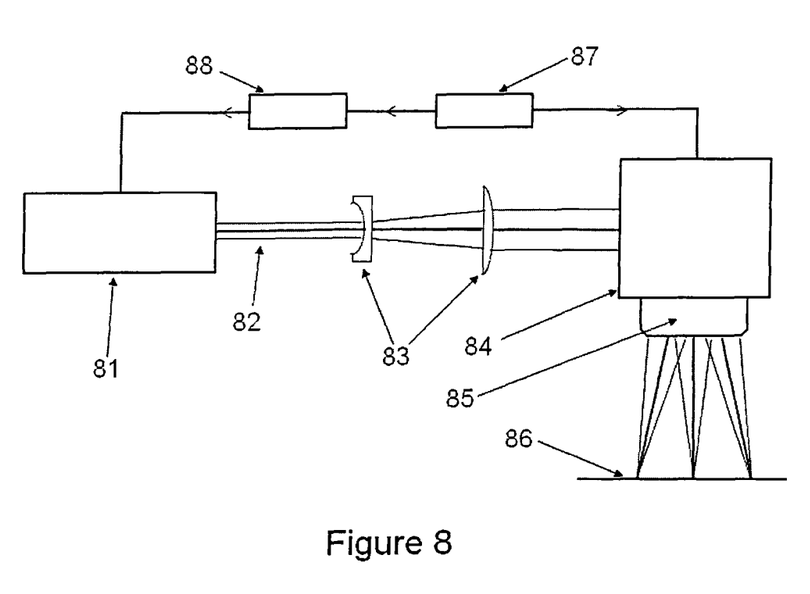
FIG. 8 is a schematic diagram of apparatus for dynamically controlling the output pulse energy of a Q-switched laser

FIG. 8

FIG. 8 shows another apparatus for implementing the invention for the case where a pulsed laser is used and the energy in individual pulses from the laser can be controlled by adjusting the width of the individual laser trigger pulses. A laser system 81 emits a beam 82. A beam expansion telescope 83 adjusts the beam diameter to suit the requirements of the application. A scanner unit 84 has two orthogonal moving mirrors so that the beam is deflected in two axes. A lens 85 focuses the beam onto the surface of a flat substrate 86. The scanner mirrors are driven by system master controller unit 87. This unit also feeds control signals to a pulse generator unit 88 that emits pulses used to trigger the Q-switched laser 81. The master controller 87 contains a calibration file that contains information relating each position in the two dimensional scan field to the laser power or energy required at that point to ablate a line of defined width. As the master controller 87 drives the scanner mirrors to make the beam move over the two dimensional scan field, it also feeds appropriate signals to the trigger pulse generator 88 in order to adjust the width of the trigger pulses and thus the energy in each pulse so as to maintain the width of the ablated line pattern constant.

The arrangement described above thus provides a method for compensating for off-axis focal spot distortion errors that occur when using a laser scanning lens to create fine line structures in layers of materials on flat substrates by direct write ablation so that the line-width of the structures is maintained substantially over the full scan area, the method comprising of:
  a. changing the power or pulse energy in the laser beam at points in the scan field that are off the primary axis where optical distortion effects introduced by the lens causes the focal spot on the substrate to increase in area such that the peak power or energy density is reduced and the width of the ablated line structure on the substrate changes from the value obtained at a point on the primary axis of the lens;
  b. changing the power or pulse energy in the laser beam at each off axis point by such an amount so as to exactly restore the width of the ablated line structure at that point to the value obtained at a point on the primary lens axis;
  c. dynamically changing the laser output power or pulse energy as the laser beam is progressively scanned across the scan area so that at all points in the scan field the power or energy in the beam is maintained at the correct value to keep the width of the ablated line structure constant.
  d. making a reference fine line pattern over the full scan area of a test sample with the laser operating with constant power or pulse energy and measuring the variation in ablated line width (compared to that on axis) at selected off axis sites and using these measurements to form the basis of a calibration data set that is subsequently used to vary the energy or power over the scan area to maintain the line width constant.

The apparatus described for carrying out this method consists of:
  a. a laser unit;
  b. laser beam scanner unit;
  c. a laser beam focussing lens;
  d. a modulator that controls the laser output;
  e. a fast control system that links the operation of the modulator to the motion of the laser focal spot in the field of the lens and rapidly changes the laser output power or pulse energy.

The invention claimed is:

1. A method of compensating for off-axis focal spot distortion that arises when a scanner and lens are used in formation of fine line structures in a substrate by direct write laser ablation, the method comprising:
  obtaining by making a reference fine line pattern over a scan area of a test sample with a laser device operating with constant power or pulse energy and measuring a deviation in ablated line width at selected off-axis positions relative to an on-axis position;
  providing a laser beam;
  scanning the laser beam across a substrate from an on-axis focal position to off-axis focal positions;
  focussing the laser beam on the substrate; and
  using the obtained data to dynamically change a laser power at the substrate based on a position of a focal spot relative to the on-axis focal position to correct for off-axis lens aberration effects that distort a size or a shape of the focal spot at that off-axis focal position relative to the on-axis focal position, so as to maintain a width of an ablated line structure at that off-axis focal position substantially the same as a width at the on-axis focal position, wherein the laser power at the substrate is changed based on the position of a focal spot relative to the on-axis position and a measured deviation in ablated line width corresponding to the position of the focal spot in the obtained data.

2. The method as claimed in claim 1, wherein a controller and a power changing device are arranged to compensate for changes in a power or pulse energy in the laser beam at points in the scan field that are the off-axis focal positions where optical distortion effects introduced by the lens cause the focal spot on the substrate to increase in area such that a peak power or energy density is reduced and the width of the ablated line structure on the substrate may thus vary from a value obtained at an on-axis focal position.

3. The method as claimed in claim 1, wherein a power or pulse energy in the laser beam is changed according to calibration data that has been determined experimentally from the laser operated at substantially constant power or pulse energy whilst being scanned over a test substrate.

4. The method as claimed in claim 2, wherein the power changing device is connected to the laser device that provides the laser beam, and is configured to change a laser output power or pulse energy output from the laser device.

5. The method as claimed in claim 2, wherein the power changing device is connected to a modulator through which the laser beam from a laser device passes and is configured to change a laser power or pulse energy output from the modulator.

* * * * *

UNITED STATES PATENT AND TRADEMARK OFFICE
CERTIFICATE OF CORRECTION

| | | |
|---|---|---|
| PATENT NO. | : 9,796,046 B2 | Page 1 of 1 |
| APPLICATION NO. | : 12/992947 | |
| DATED | : October 24, 2017 | |
| INVENTOR(S) | : Philip Thomas Rumsby | |

It is certified that error appears in the above-identified patent and that said Letters Patent is hereby corrected as shown below:

On the Title Page (75) Inventor name should read:
Philip Thomas Rumsby

Signed and Sealed this
Twenty-second Day of May, 2018

Andrei Iancu
*Director of the United States Patent and Trademark Office*